United States Patent [19]

Tsujimura et al.

[11] Patent Number: 4,954,021
[45] Date of Patent: Sep. 4, 1990

[54] INSERTED ROTARY CUTTER

[75] Inventors: Osamu Tsujimura, Kawasaki; Tatsuo Arai, Kitamoto; Takayoshi Saito, Shinagawa, all of Japan

[73] Assignee: Mitsubishi Metal Corporation, Tokyo, Japan

[21] Appl. No.: 363,937

[22] Filed: Jun. 9, 1989

[30] Foreign Application Priority Data

Jun. 10, 1988 [JP] Japan ................................. 63-143033
Jun. 10, 1988 [JP] Japan ........................... 63-076983[U]

[51] Int. Cl.$^5$ .............................................. B23C 5/22
[52] U.S. Cl. ....................................... 407/35; 407/53; 407/34
[58] Field of Search ...................... 407/34, 35, 54, 120, 407/43, 46, 47, 48, 53, 61, 55

[56] References Cited

U.S. PATENT DOCUMENTS

| | | | |
|---|---|---|---|
| 4,303,358 | 12/1981 | Grusa | 407/43 |
| 4,789,273 | 12/1988 | Wiacek | 407/34 |
| 4,808,049 | 2/1989 | Tsujimura | 407/55 |

FOREIGN PATENT DOCUMENTS 61-182713 8/1986 Japan.
942295 11/1963 United Kingdom .................. 407/35

Primary Examiner—J. J. Hartman
Assistant Examiner—Blynn Shideler
Attorney, Agent, or Firm—Cushman, Darby & Cushman

[57] ABSTRACT

An inserted rotary cutter has a tool body, at least one first insert and at least one wiper insert. The body has a plurality of insert mounting seats formed on a forward end portion thereof. Each insert is releasably mounted to a respective insert mounting seat and has had at least one end cutting edge. The inserts are arranged so that the end cutting edge of the wiper insert projects from the end cutting edge of the first insert forwardly from the body. At least one indicating mark is provided on the body for specifying the insert mounting seat, on which the wiper insert is mounted. The insert mounting seat specified by the mark has a dimensional precision within 0.01 mm in a direction along the axis of rotation.

12 Claims, 3 Drawing Sheets

INSERTED ROTARY CUTTER

BACKGROUND OF THE INVENTION

1. Field of the Invention

The present invention pertains to an inserted rotary cutter having wiper inserts mounted thereon, and more particularly to the improvement in the positioning precision of the wiper inserts.

2. Prior Art

A cutting tool such as an inserted face milling cutter (hereinafter referred to a "face milling cutter") is known, on which a plurality of indexable or throwaway inserts (hereinafter referred to as "inserts") are mounted. In a certain type of this face milling cutter, some wiper or flat drag inserts are included in the normal or usual inserts, to effect a fine or finish processing as well as a coarse processing by a single cutting processing. In such a face milling cutter, the end cutting edges of the wiper inserts project from the end cutting edges of the usual inserts forwardly with respect to the tool body by, for example, 0.06 mm, thereby causing the material surface coarse-processed by the usual inserts to be finished by the wiper inserts.

The tool body of the face milling cutter as described above has a forward end portion whose outer periphery is provided with a plurality of insert mounting seats. The usual and wiper inserts are mounted on the insert mounting seats, and are held and fixed respectively thereto by wedge members and clamp bolts. All of the insert mounting seats are formed with a general manufacturing tolerance.

In the face milling cutter of the kind referred to above, however, positioning of the wiper inserts, which effect the finish processing, requires an extremely high precision as compared with the usual inserts. For this reason, conventionally, with the face milling cutter mounted to a milling machine, a dial gauge or the like is used to measure running-out of the end cutting edges of the wiper inserts to finely adjust the position of the wiper inserts. However, high positioning accuracy cannot be desired by such adjustment. Thus, the wiper inserts are worn prematurely, and the processing accuracy deteriorates. Further, skill and an extended time period are required for the setup of the face milling cutter.

In addition, if each wiper insert has a relatively long end cutting edge, the wiper insert projects considerably from the seat member so that the seating stability of the wiper insert deteriorates. Therefore, so-called chattering vibration tends to occur, resulting in chipping of the cutting edge and skin-roughening of the processed surface.

SUMMARY OF THE INVENTION

It is therefore an object of the invention to provide an inserted rotary cutter capable of effecting positioning of wiper inserts easily and with high precision.

Another object of the invention is to provide an inserted rotary cutter capable of enhancing seating stability of wiper inserts.

According to the invention, there is provided an inserted rotary cutter comprising:

a tool body having an axis of rotation therethrough and having a plurality of insert mounting seats formed on a forward end portion thereof;

at least one first insert and at least one wiper insert each releasably mounted to a respective insert mounting seat, each of the inserts having at least one end cutting edge and being arranged so that the end cutting edge of the wiper insert projects from the end cutting edge of the first insert forwardly from the tool body; and indicating means provided on the tool body for specifying the insert mounting seat, on which the wiper insert is mounted;

the insert mounting seat specified by the indicating means having a dimensional precision within 0.01 mm in a direction along the axis of rotation.

Generally, the positioning precision of the end cutting edge of each wiper insert is within 0.036 mm in the axial direction. On the other hand, the manufacturing tolerance of the wiper insert is within 0.026 mm at its end cutting edge. Since, in the inserted cutter constructed as above, the dimensional accuracy of some insert mounting seats is within 0.01 mm, the total dimensional error is 0.036 mm if the wiper insert is mounted to this insert mounting seat. Accordingly, the positions of the end cutting edges of the wiper inserts can be adjusted to a predetermined dimensional precision only by mounting the inserts to respective insert mounting seats specified by the indicating means. This is the case even if fine adjustment of the wiper inserts is not carried out. Thus, the conventional position adjustment of the wiper inserts may be dispensed with, making it possible to carry out the setup of the wiper inserts quickly and easily. Further, since the wiper inserts can be positioned with high precision, it is possible to prolong the service life of the wiper inserts and to enhance the processing precision. Furthermore, since only the insert mounting seats, to which the wiper inserts are mounted, are formed with high dimensional precision, it is possible to reduce the manufacturing cost.

Preferably, the arrangement is such that the inserted cutter further comprises a plurality of seat members through which the first and wiper inserts are mounted respectively on the insert mounting seats, wherein the wiper insert is in the form of a polygonal plate having upper and lower surfaces, at least one ridge of at least one of the upper and lower surfaces having substantially its entire length serving as the end cutting edge, wherein at least a forward portion of the seat member, through which the wiper insert is mounted to the insert mounting seat, is formed into a configuration substantially the same as a forward portion of a seating surface of the wiper insert so that an upper surface of the forward portion of the seat member is held in contact with substantially the entire forward portion of the seating surface of the wiper insert, and wherein the insert mounting seats, on which the seat members are mounted, are formed into a configuration substantially the same as the seat members so that a surface of each insert mounting seat is held in contact with substantially the entirety of a lower surface of a respective seat member.

With such an arrangement, a cutting resistance acting upon each wiper insert is supported by a corresponding seat element, and a resistance acting upon the seat element is supported by a corresponding insert mounting seat. Thus, it is possible to enhance the mounting stability of the wiper inserts.

DESCRIPTION OF THE PREFERRED EMBODIMENTS OF THE INVENTION

Figure 1:
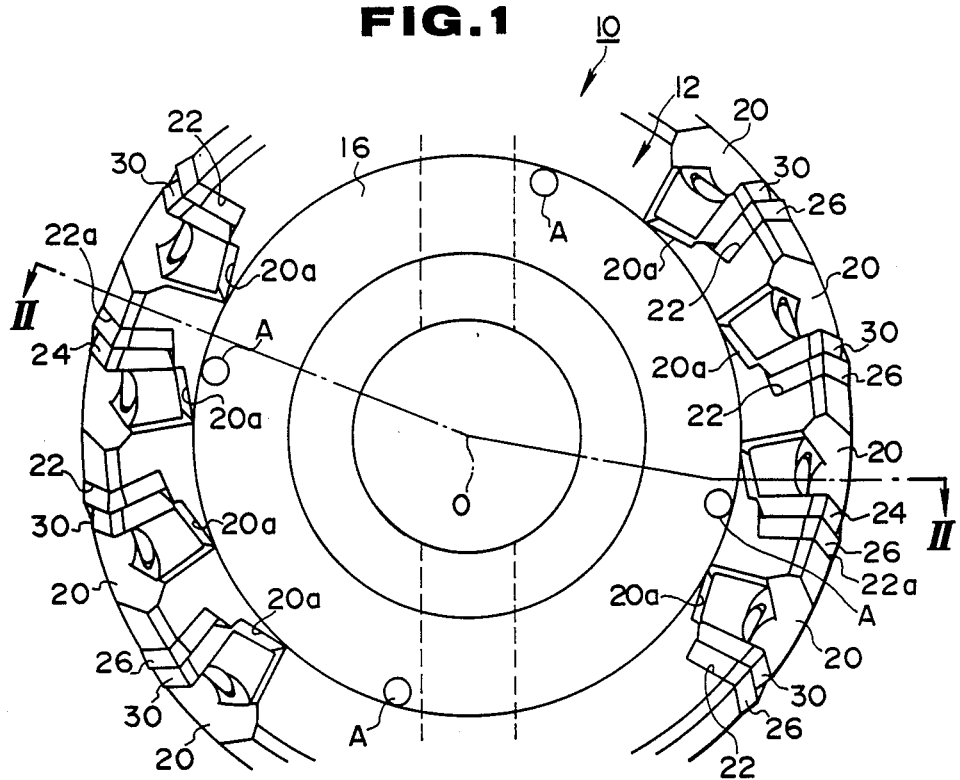
FIG. 1. is a bottom view of a face milling cutter according to an embodiment of the invention.
Figure 2:
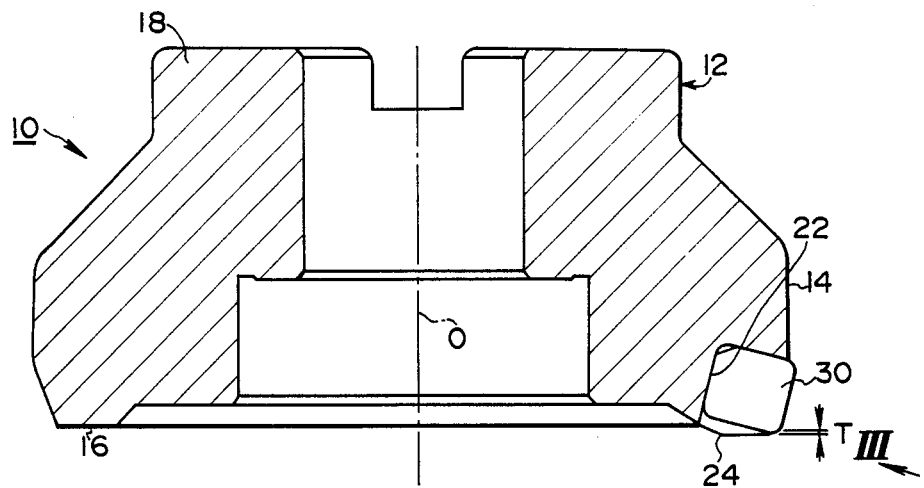
FIG. 2 is a cross-sectional view taken along the line II—II in FIG. 1.
Figure 10:
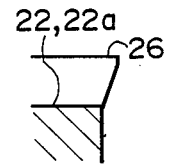
FIG. 10 is a fragmentary view as viewed from the arrow X in FIG. 6.

Referring to FIGS. 1 and 10, there is shown a face milling cutter, generally designated by the reference numeral 10, according to an embodiment of the invention. The face milling cutter 10 comprises a tool body 12 of a circular cross-section having an axis of rotation 0 therethrough and having a circumferential surface 14 and a forward end face 16 disposed perpendicular to the axis of rotation 0. The tool body 12 includes a boss 18 formed at the rearward end thereof so that it can be secured to a spindle of a milling machine.

The tool body 12 has a plurality of pockets 20 arranged in circumferentially equally spaced relation to one another and formed on a forward end portion thereof so as to open radially outwardly and forwardly from the body. Each of the pockets 20 has a wall facing toward the rotating direction of the tool body 12, and the wall is cut out in the form of a rectangle to form a insert mounting seat 22. Among the insert mounting seats 22, four seats designated by 22a are spaced 90 degrees from each other about the axis 0 and have a dimensional precision within 0.01 mm in the direction of the axis 0. These four insert mounting seats 22a are provided respectively for mounting wiper or flat drag inserts 24. In order to specify these four insert mounting seats 22a, four marks A each in the form of a circle serving as indicating means are embedded in the forward end face of the tool body 12 at locations adjacent to the insert mounting seats 22a. The insert mounting seats 22 except for the seats 22a have a usual dimensional precision which is within 0.025 mm.

Figure 3:
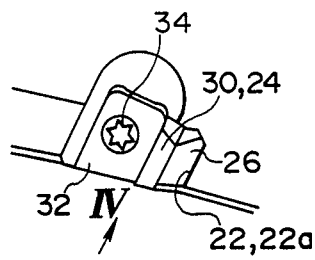
FIG. 3 is a fragmentary view as viewed from the arrow III in FIG. 2.
Figure 4:
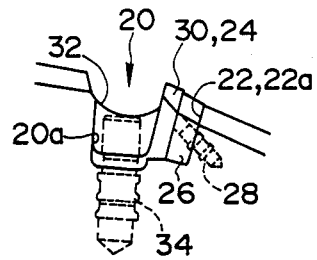
FIG. 4 is a fragmentary view as viewed from the arrow IV in FIG. 3.
Figure 6:
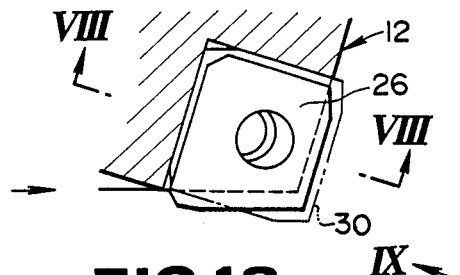
FIG. 6. is an enlarged fragmentary cross-sectional of the seat element mounted on the insert mounting seat, with the usual insert indicated by the double dotted lines.
Figure 7:
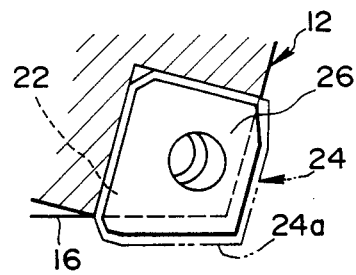
FIG. 7 is a fragmentary view similar to FIG. 6, but showing the wiper insert indicated by the double dotted lines.
Figure 13:
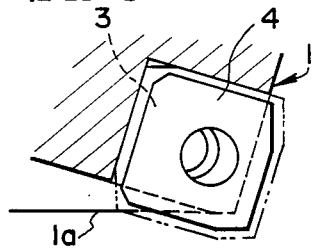
FIG. 13 is a fragmentary cross-sectional view showing a conventional seat element which is mounted on an insert mounting seat.

A seat member or element 26 is mounted by a set screw 28 to each of the insert mounting seats 22, 22a, as shown in FIGS. 3 and 4. The seat member 26 is substantially in the form of a trapezoid, as shown in FIG. 6. The seat member 26 has an upper surface with one edge arranged to extend perpendicularly to the axis 0. Each of the insert mounting seats 22, 22a has its configuration substantially identical with the seat member 26. Each of the insert mounting seats 22, 22a extends farther beyond the forward end face 16 of the tool body 12 away from the boss 18, as compared with a conventional insert mounting seat 3 shown in FIG. 13. As shown in FIG. 13, in the conventional face milling cutter, a seat member 4 is seated on the insert mounting seat 3 formed in a tool body 1 having its forward end face 1a.

Figure 8:
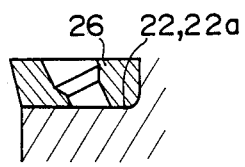
FIG. 8 is a fragmentary cross-sectional view taken along the line VIII—VIII in FIG. 6.
Figure 9:
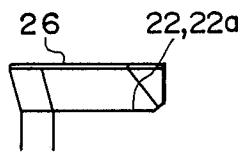
FIG. 9 is a fragmentary view as viewed from the arrow IX in FIG. 6.

As shown in FIGS. 8 through 10, the insert mounting seat 22 or 22a has its surface in contact with the entire lower surface of the seat member 26 so as to prevent the same from overhanging. As shown in FIGS. 4 and 6, the seat member 26 has its upper surface on which a usual insert (first insert) 30 or the wiper insert 24 is mounted. The insert 24 or 30 is detachably fixed by a wedge member 32 which is tightened by means of a clamp screw 34 into a recess 20a formed at the bottom surface of the pocket 20.

Figure 5:
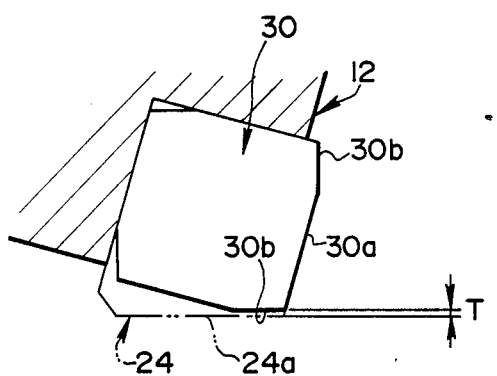
FIG. 5 is an enlarged fragmentary cross-sectional view of a usual insert mounted on an insert mounting seat through a seat element, with a wiper insert indicated by the double dotted lines.

As shown in FIG. 5, the usual insert 30 is in the form of a rectangular plate with an upper surface which has four corners and four ridges. A predetermined portion of each ridge from the corner, directed toward the counterclockwise direction, serves as a main cutting edge 30. A shorter portion, which is inclined toward the inside of the insert 30 and which is shorter in length than the main cutting edge 30a, serves as an end cutting edge 30b. The dimensional tolerance between the pair of adjacent end cutting edges 30b and 30 b is 0.026 mm. The insert 30 is so arranged that the main cutting edge 30a faces outwardly, and the end cutting edge 30b extends perpendicular to the axis 0 of rotation.

On the other hand, as indicated by the double dotted lines in FIG. 5, the wiper insert 24 is detachably mounted on the insert mounting seat 22a through the seat member 26 in same manner as the insert 30. The wiper insert 24 is substantially the same in configuration in plan as the seat member 26, but a single end cutting edge 24a of the wiper insert 24 is slightly longer than the main cutting edge 30a of the insert 30. The wiper insert 24 is so arranged that the end cutting edge 24a extends perpendicular to the axis 0, and projects from the end cutting edge 30b of the insert 30 a predetermined distance T forwardly from the tool body 12. The predetermined distance T is set to a range of from 0.01 mm to 0.1 mm. Generally, however, 0.06 mm is suitable for the predetermined distance T.

In the face milling cutter constructed as above, the dimensional precision of the insert mounting seat 22a for the wiper insert 24 is within 0.01 mm in the direction along the axis 0. Thus, when the wiper insert 24 having its dimensional precision within 0.026 mm is mounted to the insert mounting seat 22a, the total error is within 0.036 mm, so that the positioning precision of the end cutting edge 24a of the wiper insert 24 is within 0.036 mm. Accordingly, if only the wiper insert 24 is mounted on the insert mounting seat 22a specified by the corresponding mark A, the position of the end cutting edge 24a is decided within a predetermined dimensional precision. Thus, the position adjustment of the wiper insert 24 conducted conventionally can be dispensed with, making it possible to effect the setup of the face milling cutter quickly and easily. Further, since the wiper insert 24 can be positioned with high precision, it is possible to prolong the service life of the wiper insert 24 and to enhance the machining precision. Furthermore, since only the insert mounting seat 22a for the wiper insert 24 is formed with high dimensional precision, it is possible to reduce the manufacturing cost.

Moreover, the seating surface of the wiper insert 24 is entirely in contact with the upper surface of the seat member 26, and the lower surface of the seat member 26 is also in contact with the insert mounting seat 22a. With such an arrangement, the cutting resistance acting upon the wiper insert 24 is supported by the seat member 26, and the resistance acting upon the seat member 26 is supported by the insert mounting seat 22a. Accordingly, it is possible to enhance the seating stability of the wiper insert 24, even if the latter has a relatively long end cutting edge 24a. Further, since the wiper insert 24 is employed stably, it is possible to enhance the precision of the finished surface.

In the embodiment illustrated in FIGS. 1 through 10, the marks A serving as indicating means are mounted to the forward end face 16 of the tool body 12. However, the indicating means may be the conventional seat members 4 shown in FIG. 13, which are mounted to respective insert mounting seats 22 for the usual inserts 30. Alternatively, the indicating means may be configured from the pockets for the wiper inserts 24, which are different from those of the pockets for the usual inserts 30.

Figure 11:
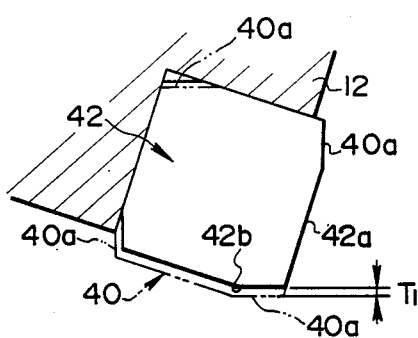
FIG. 11 is a view similar to FIG. 5, but showing a modified wiper insert indicated by the double dotted lines.
Figure 12:
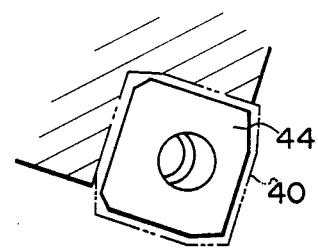
FIG. 12 is a view similar to FIG. 7, but showing a seat element on which the modified wiper insert illustrated in FIG. 11 is mounted.

Referring to FIGS. 11 and 12, there is shown a modified wiper insert 40 which is substantially the same in configuration as a usual insert 42 with main and end cutting edges 42a and 42b and has an end cutting edge slightly longer than that of the usual insert 42. Thus, the wiper insert 40 has four end cutter edges 40a. In case of the use of such a wiper insert 40, it is preferable that a seat member 44 is substantially the same in configuration as the wiper insert 40, in order to prevent the wiper insert 40 from projecting from the seat member 44. The wiper insert 40 is so arranged that the end cutting edge 40a extends perpendicularly to the axis 0 of the tool body 12. Similarly to the previous wiper insert 24, the wiper insert 40 is so arranged as to project from the end cutting edge 42b of the insert 42 a predetermined distance $T_1$ forwardly from the tool body 12. The predetermined distance $T_1$ is set to a range within 0.01 mm to 0.1 mm. Generally, however, 0.06 mm is suitable as the predetermined distance $T_1$. In the case of the modification illustrated in FIGS. 11 and 12, the seat member 44 mounted to the insert mounting seat can also serve as the indicating means.

The embodiment and the modification have been described as being applied to the face milling-cutter. It is to be understood, however, that the invention can be applied to an end mill, a side milling cutter or the like. That is, the same or similar advantages are obtained, if the invention is applied to any other suitable cutter which employs wiper inserts.

What is claimed is:

1. An inserted rotary cutter comprising:
   a tool body having an axis of rotation therethrough and having a plurality of insert mounting seats formed on a forward end portion thereof;
   at least one first insert having at least one end cutting edge facing forwardly of the body for the purpose of removing material from a workpiece and at least one wiper insert for removing a thin layer of material in a smoothing operation, said wiper insert having at least one end cutting edge which is longer than that of said first insert, each of said inserts being releasably mounted to a respective insert mounting seat and being arranged so that the end cutting edge of said wiper insert projects further from said tool body than the end cutting edge of said first insert by a predetermined distance; and
   indicating means provided on said tool body for distinguishing visually said insert mounting seat for said wiper insert from said insert mounting seat for said first insert;
   said insert mounting seat for said wiper insert being distinguishable and being formed so as to have a dimensional precision within 0.01 mm in an axial direction, while said insert mounting seat for said first insert is formed as to have a dimensional precision above 0.01 mm in an axial direction.

2. An inserted rotary cutter according to claim 1, further comprising a plurality of seat members through which said first and wiper inserts are mounted respectively on said insert mounting seats, wherein said wiper insert is in the form of a polygonal plate having upper and lower surfaces, at least one ridge of at least one of said upper and lower surfaces having substantially its entire length serving as said end cutting edge, wherein at least a forward portion of said seat member, through which said wiper insert is mounted to the insert mounting seat, is formed into a configuration substantially the same as a forward portion of a seating surface of said wiper insert so that an upper surface of the forward portion of the seat member is held in contact with substantially the entire forward portion of the seating surface of the wiper insert, and wherein said insert mounting seats, on which said seat members are mounted, are formed into a configuration substantially the same as said seat members so that a surface of each insert mounting seat is held in contact with substantially the entirety of a lower surface of a respective seat member.

3. An inserted rotary cutter according to claim 2, wherein each of said seat members is substantially in the form of a trapezoid, one ridge of the upper surface of the seat element extending perpendicular to said axis of rotation.

4. An inserted rotary cutter according to claim 1, wherein said indicating means includes at least one mark mounted on a forward end face of said tool body.

5. An inserted rotary cutter according to claim 1, wherein said wiper insert has a configuration substantially the same as said seat members.

6. An inserted rotary cutter according to claim wherein said predetermined distance is set to a range of from 0.01 mm to 0.1 mm.

7. An inserted rotary cutter according to claim 6, wherein said predetermined distance is 0.06 mm.

8. An inserted rotary cutter according to claim wherein said first insert is substantially in the form of a rectangular plate having four ridges, each of said four ridges being divided into two ranges different in length from each other, a longer one of the two ranges being formed into a main cutting edge, and the remaining range being formed into an end cutting edge, and wherein a dimensional tolerance between the adjacent end cutting edges is 0.026 mm.

9. An inserted rotary cutter according to claim 1, wherein said wiper insert has a configuration substantially the same as said first insert.

10. An inserted rotary cutter according to claim 9, wherein said first insert is substantially in the form of a rectangular plate having four ridges, each of said four ridges being divided into two ranges different in length from each other, a longer one of the two ranges being formed into a main cutting edge, and the remaining range being formed into an end cutting edge.

11. An inserted rotary cutter comprising:
- a tool body having an axis of rotation therethrough and having a plurality of insert mounting seats formed on a forward end portion thereof;
- at least one first cutting insert and at least one wiper insert each of aid inserts having at least one end cutting edge, each of said inserts being releasably mounted to a respective insert mounting seat and being arranged so that the end cutting edge of said wiper insert projects further from said tool body than the end cutting edge of said first insert by a predetermined distance;
- indicating means provided on said tool body for distinguishing visually said insert for said first insert;
- said insert mounting seat for said wiper insert being distinguishable and being formed so as to have a dimensional precision within 0.01 mm in an axial direction, and a plurality of seat members through which said first and wiper inserts are mounted respectively on said insert mounting seats,
- said wiper insert being in the form of a polygonal plate having upper and lower surfaces,
- at least one ridge of at least one of said upper and lower surfaces having substantially its entire length serving as said end cutting edge,
- at least a forward portion of said seat member, through which said wiper insert is mounted to the insert mounting seat, being formed into a configuration substantially the same as a forward portion of a seating surface of said wiper insert so that an upper surface of the forward portion of the seat member is held in contact with substantially the entire forward portion of the seating surface of the wiper insert, and
- said insert mounting seats, on which said seat members are mounted, being formed into a configuration substantially the same as said seat members so that a surface of each insert mounting seat is held in contact with substantially the entirety of a lower surface of a respective seat member.

12. An inserted rotary cutter according to claim 11, wherein each of said insert seat members is substantially in the form of a trapezoid, a ridge of an upper surface of the seat member extending perpendicular to said axis of rotation.

* * * * *